Sept. 23, 1958  L. E. NELSON  2,853,082
DENTAL FLOSS HOLDER
Filed Sept. 23, 1955
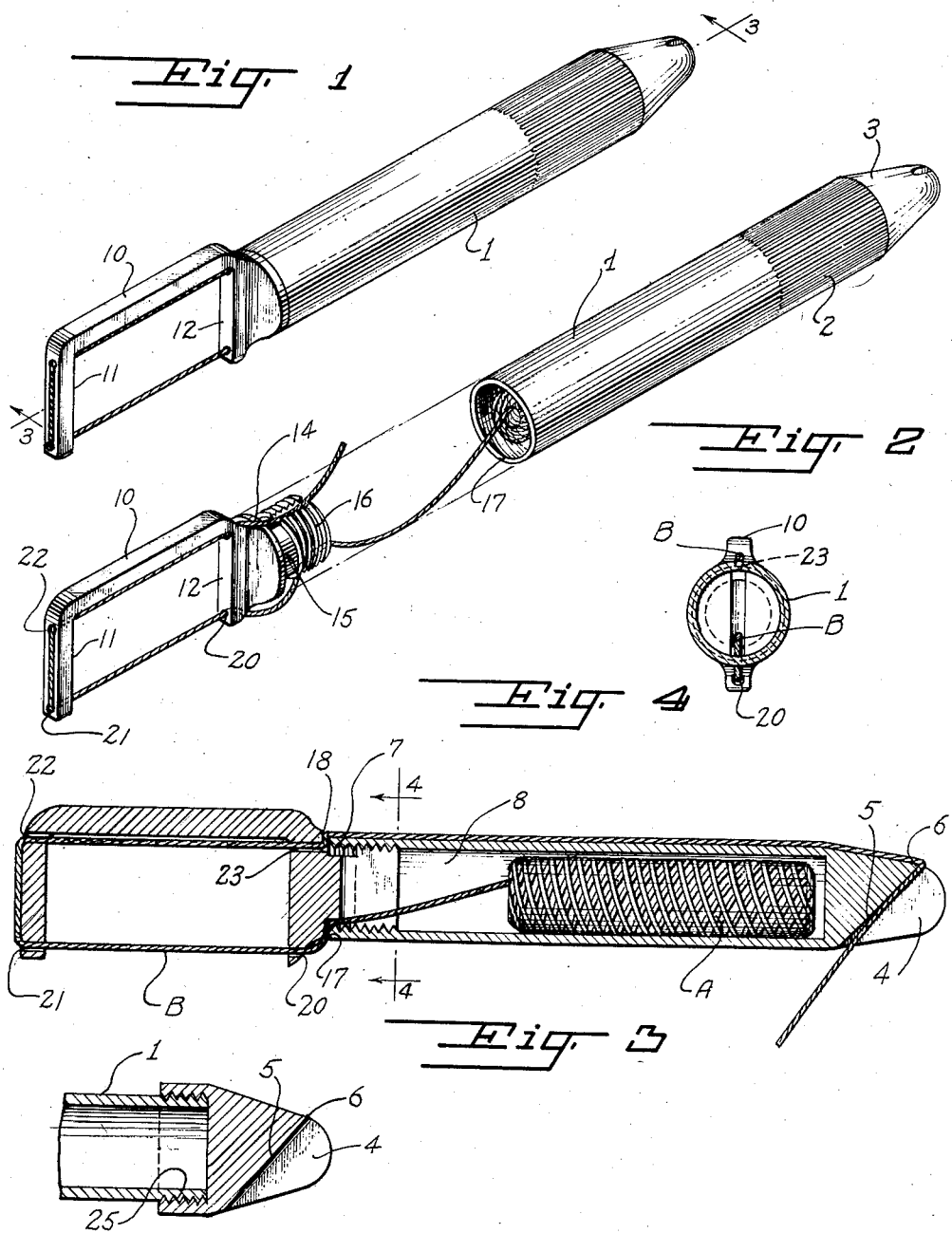
INVENTOR.
Leroy E. Nelson
BY
Attorney United States Patent Office 2,853,082
Patented Sept. 23, 1958

2,853,082

DENTAL FLOSS HOLDER

Leroy E. Nelson, Minneapolis, Minn.

Application September 23, 1955, Serial No. 536,192

1 Claim. (Cl. 132—92)

This invention relates to improvements in dental floss holders.

One of the main objects of the present invention is to provide a dental floss holder in which the handle is provided as a container for holding any standard brand of dental floss, and from which handle the floss is fed to an operating position and retained in that position against movement in either direction.

Another object of the invention is to provide a device of the character described in which the threading of the dental floss to operating position is facilitated by improvements in structure and design.

Another object of the invention is to provide a dental floss holder in which the container for the floss package operates as a locking means for holding the floss against movement during use.

A still further object of the invention is to provide a novel cutting means for permitting the removal of the loose or used end of the dental floss, the cutter being an integral part of the handle structure and the cutting edge being arranged in a position to facilitate the cutting operation.

Another object of the invention is to provide a dental floss holder in which the shape is better adapted to fit into the mouth of a person using it, enabling the operator to reach all such positions in the mouth as to enable cleaning between any of the teeth.

These and other objects of the invention will more clearly hereinafter appear by reference to the accompanying drawings forming a part of the instant specification and wherein like reference characters designate corresponding parts throughout the several views, in which:

Fig. 1 is a perspective view of the assembly;

Fig. 2 is a perspective view of the assembly with the parts in exploded position and showing the feeding of the dental floss from the container handle to the holder;

Fig. 3 is a longitudinal sectional view on the line 3—3 through the structure of Fig. 1 but showing the dental floss in a position to be severed by the cutting edge formed on the outer end of the container handle;

Fig. 4 is a transverse section on line 4—4 of Fig. 3; and

Fig. 5 is a fragmentary section showing the cutter member as a detachable element on the outer end of the container handle.

Basically the invention, as stated above, comprehends improvements which are designed to provide easier methods of using dental floss. Broadly dental floss holders are old, however, such dental floss holders have never been popular because their structure and design did not permit ready manipulation and use. In the present invention it is proposed that the characteristics of the toothbrush be embodied in the design to facilitate handling and use, this thought being applied both to structure and size. To accomplish the foregoing, handle 1 of the present structure is in the form of a cylinder of generally uniform diameter throughout and of such a length as to enable this cylinder to be used as a handle for the implement. The handle is shown as generally smooth throughout the general portion of its length, but serrated at 2 at its lower end to provide a gripping end for manipulating the device as will hereinafter more clearly appear. The outer end of the handle 1 is closed and of tapered solid construction, as shown at 3, with a medial slot defined by side walls 4 and base portion 5, the latter terminating at its outer end 6 in a cutting edge which is used for severing the dental floss when desired. It will be noted that the angle of the face 5 is provided to present a direction of pull tending to utilize the cutting edge rather than tending to feed the dental floss.

The inner end of the tubular handle 1 is threaded for a substantial distance as shown at 7, this threaded end being provided to function in two ways, i. e. to provide a connecting means between the dental floss holder and the dental floss container and to provide an adjustable clamp between these parts for locking the dental floss against movement in the holder in either direction. It will be noted that the opening 8 in the cylinder forming the handle 1 is of relatively large size so that it will accommodate any commercial type and size of dental floss now used on the market. The dental floss holder includes a bow portion of general U-shape, the base of the U being indicated at 10 and the two arms of the structure being identified by reference characters 11 and 12. This bow structure is formed integral with or attached to a cap 14 having a smooth shank extension 15 and a threaded shank end portion 16, the latter being adapted for cooperation with the threads 7 of the cylindrical handle. By this construction the internal threads 7 at the end of the handle 1 can be threaded onto the shank, the relative number or length of the threads on the shank and the number or length of the internal threads on the cap permitting a longitudinal adjustment between the parts whereby the marginal edge 17 of the cylinder will abut against the annular flange 18 of the shank for clamping engagement against the dental floss at spaced points to lock the floss against movement.

Inasmuch as the threading of the floss through the holder must be accomplished at times under adverse conditions, openings are arranged and provided to facilitate the threading of the dental floss as it passes from the roll of floss indicated at A in the container to the bow structure where the floss is utilized by the operator, as shown at B. The shank of the dental floss holder is slotted transversely throughout a substantial portion of its length, the slot being positioned at the diameter of the shank and extending inwardly beyond the threaded portion 16 and throughout a substantial portion of the smooth shank area 15. By having this shank slotted, the dental floss can pass freely from the spool A to the discharge point in the structure adjacent the opening 20 at the free end of the arm 12 of the bow frame, this point of discharge of the floss necessitates the floss passing between the free end 12 of the cylinder and the annular flange 18 of the shank where it can be clamped by tightening the the handle on the shank. From the opening 20 in the arm 12 of the bow, the floss passes to and through the opening 21 in the arm 11 of the bow structure and outwardly along the outer face of the arm 11 to the transverse opening 22 formed at the junction of the arm 11 and the base 10. From this point the floss extends to a corresponding opening 23 at the junction of the arm 12 of the bow and its base 10, and it will be noted that this opening terminates inwardly of the shank at a point where the end 12 of the cylinder abuts the flange 18, so that the floss again is in position to be clamped between these parts when the handle is tightened on the threads of the bow holder. Thus the floss after being adjusted to present a fresh portion between the bow as at B is locked at both its feed and discharge sides and the floss area in use is maintained rigid. After using the device a new portion of floss may be presented at B and the old portion severed at 6 by unscrewing the handle 1 on the holder portion and permitting the floss to be withdrawn from its package at A and forward throughout its path of movement, as best shown in Fig. 3.

The present structure presents many appealing factors not only in use, but also in manufacture, and in this connection attention is called to the fragmentary view in Fig. 5 in which the outer end of the cylinder 1 is shown as formed of a separate piece which is threaded onto the cylinder as indicated at 25. This modified form represents a structure which may be more cheaply manufactured than the structure of the main disclosure. It will be noted that the holes through which the loose ends of the dental floss contained in the handle is to be threaded are formed at portions and through structures that make these holes as short as possible, this being quite desirable and aids materially in any threading operation.

In use the handle can be given a half turn or a sufficient turn on the holder to free the floss from the locked points between the cylinder 1 and the flange 18 and then the free end of the floss will be gripped and drawn along the length of the handle to present a new clean area at B for use by the operator. When the floss is to be cut off, this same operation is followed and the floss is pulled out to such a length as to bring the portion to be removed beyond the cutting edge 6 where it can be severed by a downward movement, preferably in the direction of the angle of the face 5 defining the cutting edge 6.

One of the most desirable characteristics of the present development is the fact that when the dental floss is clamped in position for use and in which position it is subject to moisture and moisture movement, the spool or mass of the floss is protected by being sealed between the end 17 of the handle and the face of the flange 18. It will also be noted that the entire structure presents no faces which cannot be readily sterilized or cleaned and that the general design is such as to present an offset at the holder end which is inserted into the mouth not substantially greater than the diameter of the average floss package. It is to be understood that the illustration is a substantially enlarged portion of the development and the actual structure is materially reduced over the disclosure.

What I claim is:

In a dental floss holder, a tubular floss container forming a handle and having internal threads at one end, the other end of said tubular container being closed by a solid extremity, the outer end of said solid extremity being formed with a diagonal slot extending therethrough and having a cutting edge for severing the floss, a floss support removably secured on said handle, said floss support including a U-shaped element formed of a base portion and a pair of spaced arms which the floss spans when in use, a shank portion projecting from one of said arms, said shank portion having its outer end portion externally threaded and formed with a transverse slot, said U-shaped element including passageways for the threading of the floss, said passageways being formed in spaced aligned pairs, one of the pairs of passageways being at the end portions of said arms, and the other pair of passageways being at the base of said arms, the passageway at the inner arm on which the shank is mounted being positioned to direct the floss across the threaded end of the floss container and the shank for binding and holding the floss when the thread on the shank of the floss support is turned up into the internal threads of the tubular floss container.

References Cited in the file of this patent

UNITED STATES PATENTS

| | | |
|---|---|---|
| 1,723,842 | Cammack | Aug. 6, 1929 |
| 1,879,074 | Cammack | Sept. 27, 1932 |
| 1,952,358 | Bohm | Mar. 27, 1934 |
| 2,113,439 | Bean | Apr. 5, 1938 |
| 2,577,597 | Wright et al. | Dec. 4, 1951 |